United States Patent
Hatakeyama et al.

(10) Patent No.: US 10,889,252 B2
(45) Date of Patent: Jan. 12, 2021

(54) VEHICLE BODY REAR STRUCTURE

(71) Applicant: HONDA MOTOR CO., LTD., Tokyo (JP)

(72) Inventors: Shuhei Hatakeyama, Wako (JP); Yasuyuki Kato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 16/361,407

(22) Filed: Mar. 22, 2019

(65) Prior Publication Data
US 2019/0299879 A1 Oct. 3, 2019

(30) Foreign Application Priority Data
Mar. 27, 2018 (JP) .................................. 2018-059246

(51) Int. Cl.
*B60R 11/04* (2006.01)
*B60R 13/00* (2006.01)
(Continued)

(52) U.S. Cl.
CPC ............ *B60R 11/04* (2013.01); *B60R 13/005* (2013.01); *B60R 13/10* (2013.01); *B60R 19/02* (2013.01);
(Continued)

(58) Field of Classification Search
CPC ... B60J 5/10; B60J 5/101; B60R 11/04; B60R 13/005; B60R 13/04; B60R 13/10; B60R 19/02
(Continued)

(56) References Cited

U.S. PATENT DOCUMENTS 8,698,894 B2 * 4/2014 Briggance .............. H04N 5/374
348/148
9,150,165 B1 * 10/2015 Fortin ..................... B60R 11/04
(Continued)

FOREIGN PATENT DOCUMENTS

DE 102011017240 A1 * 12/2011 ............. B60R 11/04
JP 2003-008951 A 1/2003
(Continued)

OTHER PUBLICATIONS

Japanese Office Action (English translation is not available) dated Sep. 10, 2019 (3 pages).

*Primary Examiner* — Jason S Daniels
(74) *Attorney, Agent, or Firm* — Rankin, Hill & Clark LLP

(57) ABSTRACT

A vehicle body rear structure includes: an opening and closing body for opening and closing an opening defined in a vehicle body rear part, the opening and closing body having an outer panel and an inner panel located inwardly of the outer panel, the outer panel having a rear surface part facing substantially in a vehicle rearward direction; a license plate provided on a bumper member under the opening and closing body; an emblem disposed on the rear surface part and having a projecting part projecting rearward from the rear surface part outer panel; and an image capturing device installed between the rear surface part and the inner panel and configured to capture images behind the vehicle. The rear surface part has an installation hole which is located at a position lower than the projecting part and in which the image capturing device is installed.

8 Claims, 4 Drawing Sheets

(51) Int. Cl.
*B62D 25/08* (2006.01)
*B60R 13/10* (2006.01)
*B60R 19/02* (2006.01)
*B60R 11/00* (2006.01)

(52) U.S. Cl.
CPC ...... *B62D 25/087* (2013.01); *B60R 2011/004* (2013.01); *B60R 2011/0043* (2013.01)

(58) Field of Classification Search
USPC ............. 296/50, 56, 57.1, 152, 193.08
See application file for complete search history.

(56) References Cited

U.S. PATENT DOCUMENTS

| | | | |
|---|---|---|---|
| 9,446,721 B2* | 9/2016 | Jagoda | B60R 11/04 |
| 2014/0054907 A1* | 2/2014 | So | B60R 19/03 |
| | | | 293/120 |
| 2015/0097384 A1* | 4/2015 | Conrod | B60R 19/18 |
| | | | 293/102 |
| 2015/0151698 A1* | 6/2015 | Lee | B60R 19/24 |
| | | | 293/120 |
| 2016/0219204 A1* | 7/2016 | Nickel | B60R 11/04 |
| 2017/0106808 A1* | 4/2017 | Fuchs | B60R 13/005 |
| 2017/0346997 A1* | 11/2017 | Sato | G02B 27/0006 |

FOREIGN PATENT DOCUMENTS

| | | |
|---|---|---|
| JP | 2014-210529 A | 11/2014 |
| JP | 2018-043632 A | 3/2018 |
| JP | 2018-103807 A | 7/2018 |

\* cited by examiner

VEHICLE BODY REAR STRUCTURE

CROSS-REFERENCE TO RELATED APPLICATIONS

The present application claims priority under 35 U.S.C. § 119 to Japanese Patent Application No. 2018-059246, filed on Mar. 27, 2018, the contents of which are hereby incorporated by reference in its entirety.

BACKGROUND OF THE INVENTION

1. Field of the Invention

The present invention relates to a vehicle body rear structure, particularly a vehicle body rear structure which, in a vehicle body rear portion, includes an image capturing device for capturing images behind an automobile.

2. Description of the Related Art

A known example of a vehicle mounted monitor device using an image capturing device (hereinafter referred to as a "rear camera" as appropriate) arranged in a vehicle body rear part of an automobile is the one described in Japanese Patent Application Publication No. 2003-8951 (Patent Document 1) (see FIGS. 9(a) and 9(b)). Rear cameras are in general arranged on an upper side of the place where a license plate is disposed, like the vehicle mounted monitor device described in Japanese Patent Application Publication No. 2003-8951.

In addition, when the license plate is mounted on a bumper of an automobile, the rear camera is in general disposed on a portion of the bumper that is above the place where the license plate is disposed.

SUMMARY OF THE INVENTION

When the rear camera is disposed on a portion of the bumper of an automobile that is above the place where the license plate is disposed as described in Japanese Patent Application Publication No. 2003-8951, it is necessary to take measures for obtaining an appropriate angle of view of the rear camera and take measures against raindrops.

In particular, for an automobile whose license plate is disposed on a bumper, the rear camera is located at a low position near the ground surface. Thus, it is likely that, raindrops on a rainy day, muddy water splashed while the automobile is running, and the like adhere to a lens of the rear camera. As a consequence, the raindrops, the splashed muddy water and the like are likely to be captured in the images taken by the rear camera.

The present invention has been made keeping in mind the above-described problems, and an object of the present invention is to provide a vehicle body rear structure which makes it easy to prevent an image capturing device from capturing raindrops, muddy water and the like.

A vehicle body rear structure according to an embodiment of the present invention includes: an opening and closing body for opening and closing an opening defined in a vehicle body rear part, the opening and closing body having an outer panel and an inner panel located on an inner side of the vehicle relative to the outer panel, the opening and closing body having a rear surface portion formed by the outer panel and the inner panel and facing substantially in a vehicle rearward direction; a license plate provided on a bumper member located at a position lower than the opening and closing body; an emblem part arranged on the rear surface portion and comprising a projecting part projecting rearward from the rear surface portion; and an image capturing device installed between the outer panel and the inner panel in the rear surface portion and configured to capture images behind the vehicle. The image capturing device is installed in an image capturing device installation hole formed on a portion of the rear surface portion that is lower than the projecting part.

The present invention can provide a vehicle body rear structure which makes it easy to prevent the image capturing device from capturing raindrops, muddy water and the like.

DETAILED DESCRIPTION OF THE EMBODIMENTS

Referring to FIGS. 1 to 5, descriptions will be given of an example of a vehicle body rear structure according to an embodiment of the present invention.

The descriptions will be provided as appropriate with "front", "rear", "up", "down", "left" and "right" representing a forward direction of, a rearward direction of, a vertically upward direction from, a vertically downward direction from, and width directions of the vehicle.

Vehicle

Figure 1:
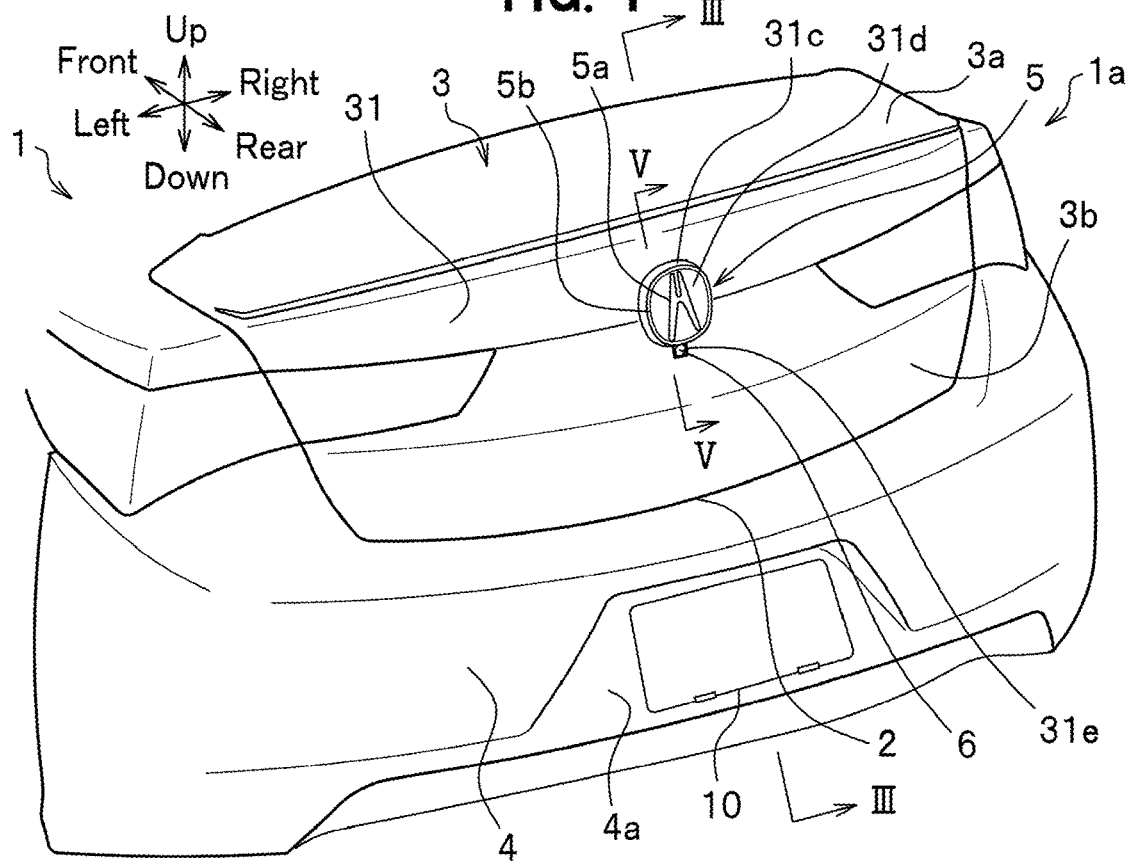
FIG. 1 is a perspective view of an example of main parts of a vehicle body rear structure according to an embodiment of the present invention, showing how an emblem is installed in the vehicle body rear structure.
Figure 2:
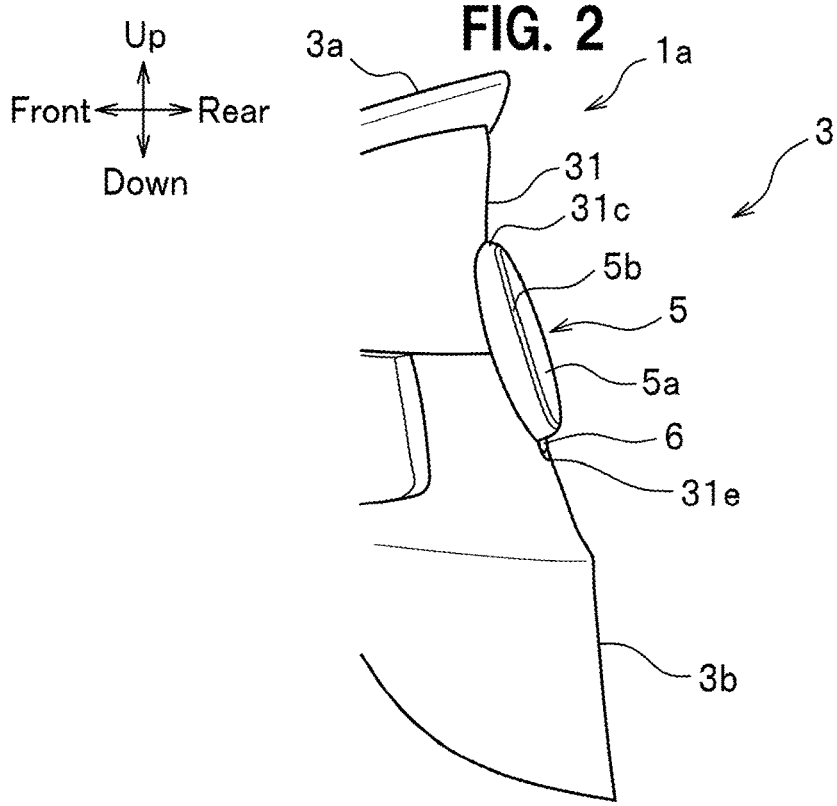
FIG. 2 is an enlarged side view of main parts of the vehicle body rear structure, showing how the emblem is mounted thereon.

As illustrated in FIG. 1, a vehicle 1 has an opening and closing body 3 in a vehicle body rear part 1a. Examples of the opening and closing body 3 includes: a trunk lid which allows opening and closing of an opening 2; a back door that opens upward; double back doors that swing open; and a single hinged back door that swings open. The category or type of the vehicle 1 is not specifically limited.

The present invention will be hereinbelow described using an example in which the opening and closing body 3 provided in the vehicle body rear part 1a of the vehicle 1 is a trunk lid for opening and closing the opening 2.

Examples of the vehicle 1 include hatchbacks, sedans, sport utility vehicles (SUV), one box cars, and minivans.

Vehicle Body Rear Part

Figure 3:
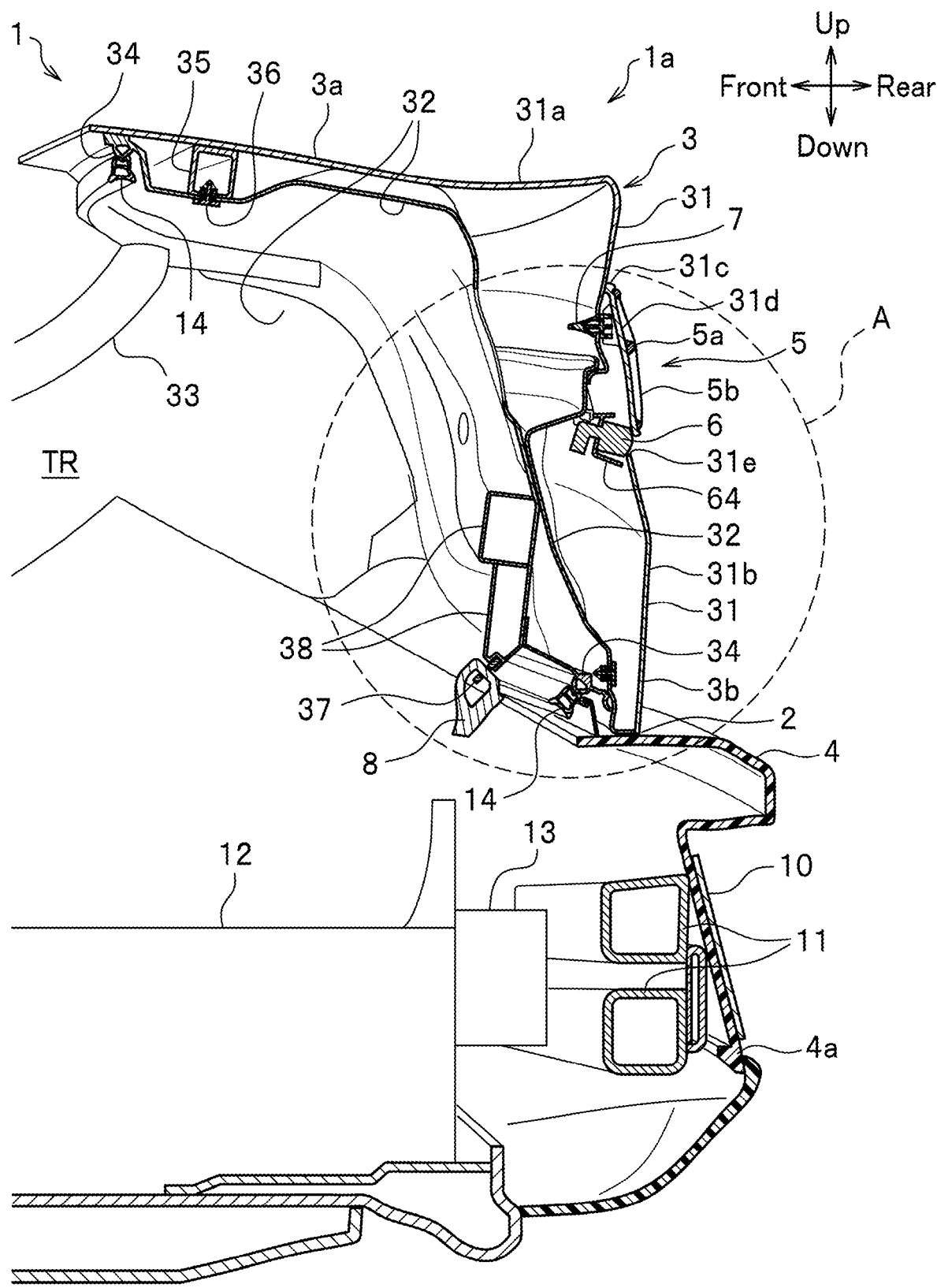
FIG. 3 is an enlarged cross-sectional view taken along line III-III in FIG. 1.

As illustrated in FIG. 3, the vehicle body rear part 1a includes: the opening and closing body 3 having an emblem 5 and an image capturing device 6; a bumper member 4 having a license plate 10; rear bumper beams 11; and rear side frames 12.

Opening and Closing Body

The opening and closing body 3 is a trunk lid for opening and closing the opening 2 of a trunk room TR provided in the vehicle body rear part 1a to allow storing luggage. The opening and closing body 3 mainly includes an outer panel 31, and an inner panel 32 on an inner side of the vehicle relative to the outer panel 31. The opening and closing body 3 is provided with a hinge mechanism 33, the emblem 5, the image capturing device 6, an outer weather strip 34, a striker 37, striker attachment reinforcing member 38, and a harness (not illustrated). The opening and closing body 3 includes an upper surface part 3a extending substantially horizontally in the front-rear direction and a rear surface part 3b extending downward from a rear end of the upper surface part 3a, and has a substantially inverted L-shape in vertical cross-sectional view. The emblem 5 and the image capturing device 6 are arranged on a portion of the rear surface part 3b that is slightly higher than a central portion of the rear surface part 3b (see FIG. 1).

Outer Panel

As illustrated in FIG. 3, the outer panel 31 is a metal plate member forming a vehicle exterior surface of the opening and closing body 3. The outer panel 31 and the inner panel 32 can be formed, for example, by pressing a rolled steel plate. The outer panel 31 is made up of an upper outer panel 31a and a lower outer panel 31b. The lower outer panel 31b includes a projecting part 31c with an emblem decoration portion 31d and an image capturing device installation hole 31e.

The upper outer panel 31a is a metal panel member forming the upper surface part 3a of the outer panel 31 and an upper half of the rear surface part 3b of the outer panel 31. The upper outer panel 31a has a substantially L-shape in vertical cross-sectional view.

Figure 4:
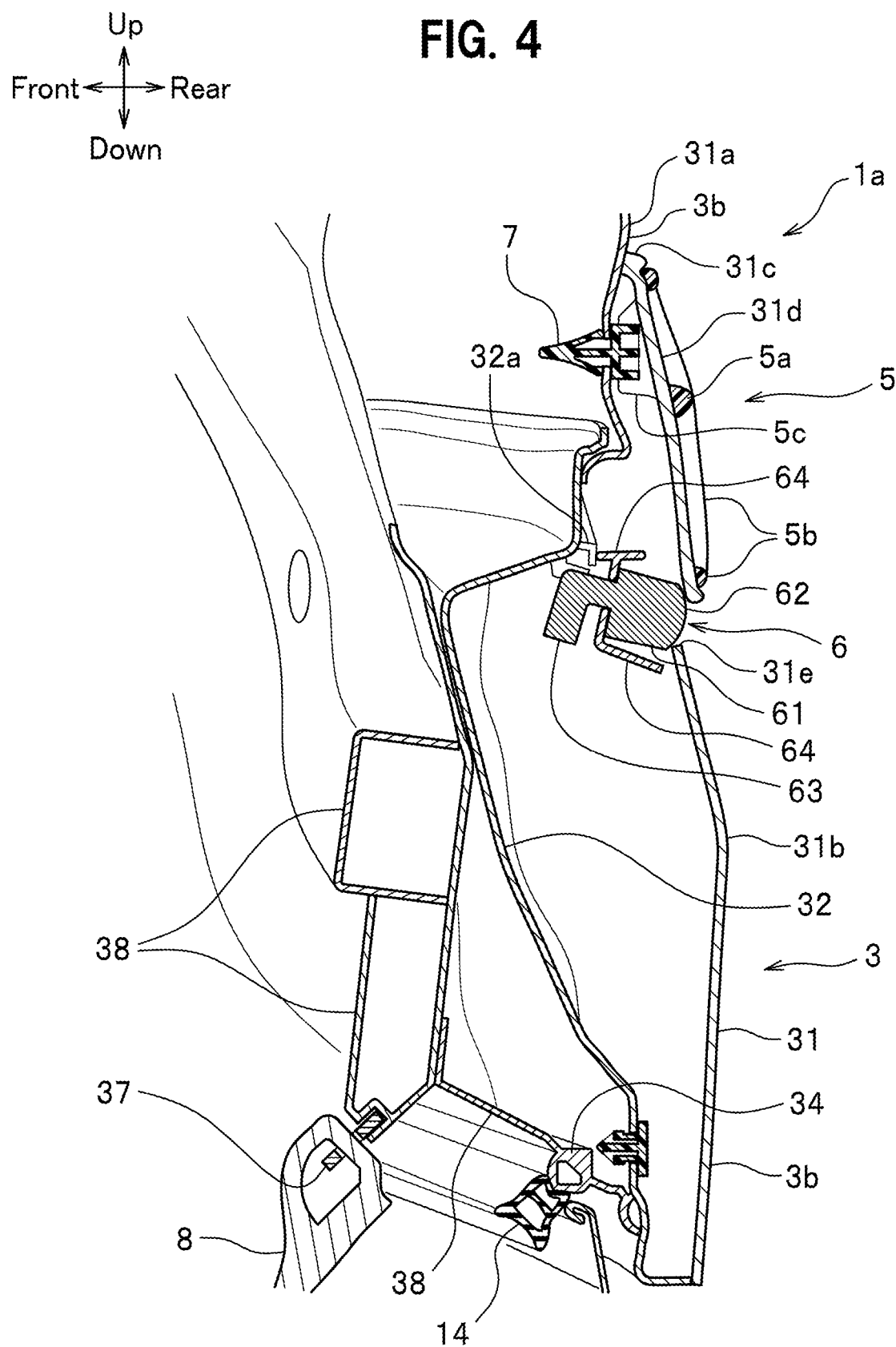
FIG. 4 is a detailed view of the area A in FIG. 3.

As illustrated in FIG. 4, the lower outer panel 31b is a metal panel member provided under a rear end portion of the upper outer panel 31a. The lower outer panel 31b forms a portion of the exterior surface of the outer panel 31 that extends from a location slightly higher than a vertical center of the rear surface part 3b of the outer panel 31 to a lower end thereof.

Figure 5:
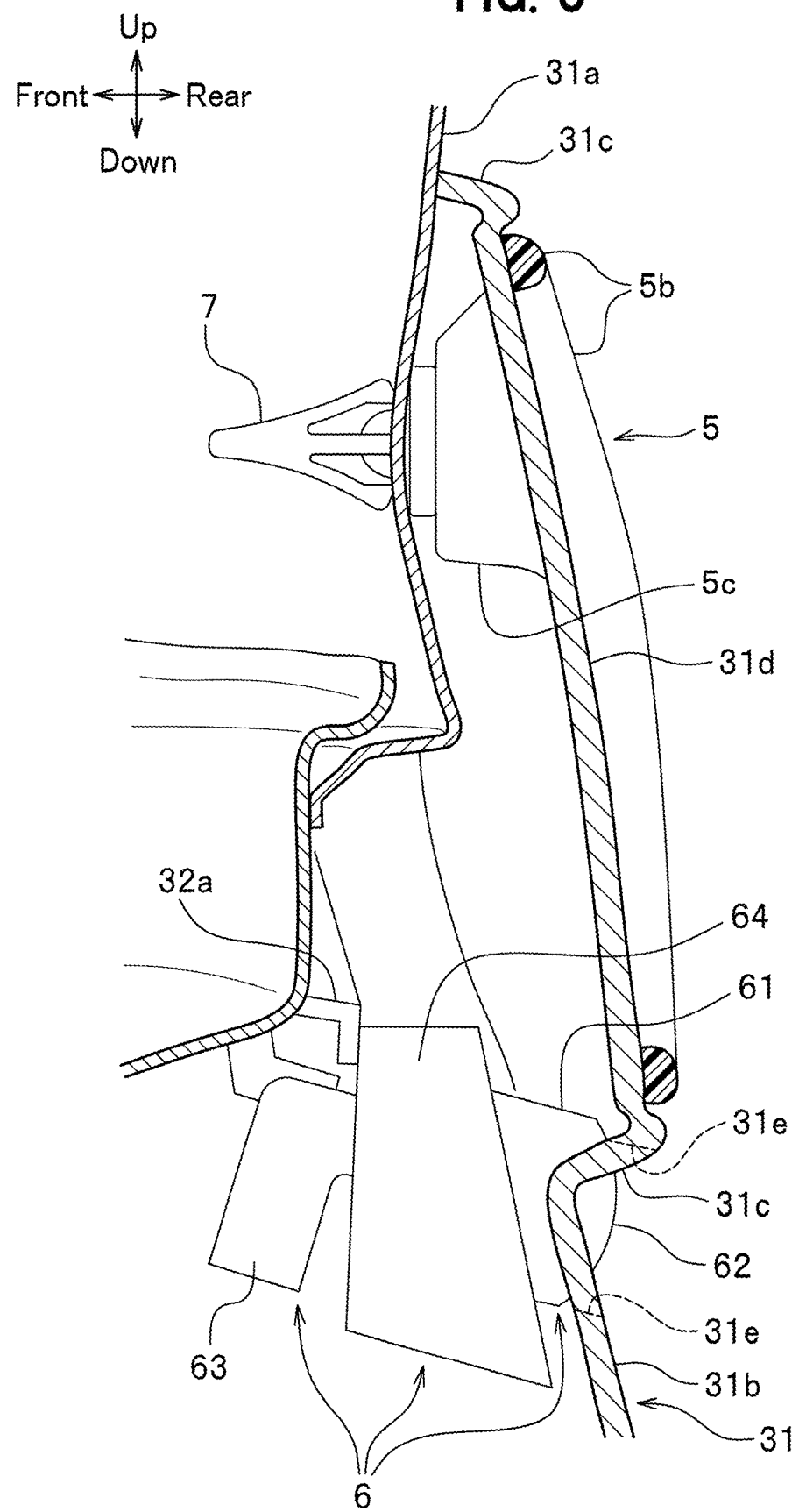
FIG. 5 is an enlarged cross-sectional view taken along line V-V in FIG. 1.

As illustrated in FIG. 5, the projecting part 31c serves as a pedestal of the emblem 5 and is a projection with a substantially circular shape in rear view. The projecting part 31c is integrally formed on the lower outer panel 31b, and projects rearward from a rear surface of the outer panel 31, at a central portion of an upper end portion of the lower outer panel 31b. Furthermore, as illustrated in FIG. 1, the projecting part 31c is formed such that an upper half of the circular projecting part 31c projects upward from the upper end of the lower outer panel 31b in a semicircular shape in rear view. The projecting part 31c has a peripheral projection projecting rearward and having a substantially circular annular shape. The projecting part 31c has an upper wall surrounded by the annular projection, having a rear surface facing substantially rearward and having a height lower than the annular projection. This upper wall is the emblem decoration portion 31d.

As illustrated in FIGS. 4 and 5, on the rear surface of the emblem decoration portion 31d, the later described emblematic design element 5a and frame 5b of the emblem 5 are disposed. The emblem decoration portion 31d has a substantially circular shape corresponding to the shape of the annular projection of the projecting part 31c in rear view.

The image capturing device installation hole 31e is a through-hole in which to install the image capturing device 6. The image capturing device installation hole 31e is formed on the rear surface part 3b of the lower outer panel 31b, at a location adjacent to a lower end portion of the projecting part 31c that is located centrally relative to the vehicle width direction length of the projecting part 31c.

Inner Panel

As illustrated in FIG. 3, the inner panel 32 is a metal plate member forming a vehicle interior surface of the opening and closing body 3. The hinge mechanism 33, the outer weather strip 34, a reinforcement member 35 and a reinforcement member fixing clip 36 are provided on a forward portion of the inner panel 32.

Emblem

As illustrated in FIG. 4, the emblem 5 is a design identifying a manufacturer and/or a model name of the automobile. The emblem 5 is made up of the projecting part 31c serving as the pedestal of the emblem 5 and having the emblem decoration portion 31d, an emblematic design element 5a provided on the emblem decoration portion 31d, and a frame 5b provided around the emblem decoration portion 31d. The emblem 5 is provided with a fixation device installation portion 5c on which to install a fixation device 7. The emblem 5 is configured such that the emblem decoration portion 31d extends from the rear surface part 3b toward the rear of the vehicle and inclines downward.

The emblematic design element 5a is, for example, a member formed in the style of a mark or the like of the manufacturer (see FIG. 1). The emblematic design element 5a is made of a plastic or metal material.

The frame 5b is an annular portion formed to surround an outer periphery portion of the emblematic design element 5a. The frame 5b is formed integrally with the emblematic design element 5a and the fixation device installation portion 5c.

As illustrated in FIGS. 4 and 5, the fixation device 7 for fixing the emblem is installed on the fixation device installation portion 5c. The fixation device installation portion 5c is formed at a central location of an upper portion of the vehicle forward side of the emblem decoration portion 31d. The fixation device installation portion 5c is arranged at a higher position relative to the image capturing device 6. The fixation device installation portion 5c has a through-hole (not shown) into which the fixation device 7 is attached.

The fixation device 7 is, for example, a plastic clip for fixing the emblem 5 to the outer panel 31 of the opening and closing body 3.

Image Capturing Device

Referring to FIG. 5, the image capturing device 6 is a back camera (also referred to as "back view camera" or "rear view camera") for monitoring the rear area of the vehicle 1 by capturing images behind the vehicle 1. The images captured by the image capturing device 6 are, for example, displayed on a display of a car navigation system provided on an instrument panel.

The image capturing device 6 includes: an image capturing device main body 61; a lens part 62 and a connector part 63 provided to the image capturing device main body 61; and a cover member 64 attached to the image capturing device main body 61. The image capturing device 6 is installed between the rear surface part 3b of the outer panel 31 and the inner panel 32.

The lens part 62 is arranged on a rear end portion of the image capturing device main body 61. The lens part 62 is provided in engagement with the image capturing device installation hole 31e formed at a position slightly lower than the projecting part 31c. The connector part 63 is disposed on a front end portion of the image capturing device main body 61. The harness (not illustrated) is installed from the vehicle body via the vicinity of the hinge mechanism 33 (see FIG. 3) into the opening and closing body 3 and is connected to the connector part 63.

As illustrated in FIG. 5, the cover member 64 is a cylindrical plastic protective cover that is attached to an outer peripheral portion of the image capturing device main body 61 so as to cover the image capturing device main body 61. A bracket (not shown), which is formed of a metal plate member, is attached to the cover member 64 and the image capturing device main body 61. The cover member 64 and the image capturing device main body 61 are fixed in the opening and closing body 3 by screwing the bracket (not shown) to a bracket fixing member 32*a* attached to the inner panel 32.

As illustrated in FIG. 3, the hinge mechanism 33 is a coupling device by which the opening and closing body 3 is rotatably coupled to the vehicle body. The hinge mechanism 33 has a rear end portion fixed to the inner panel 32 and a front end portion rotatably coupled to the vehicle body.

The outer weather strip 34 is a rubber member for blocking rainwater from entering the trunk room TR. The outer weather strip 34 is provided along a peripheral portion of the trunk room TR side of the inner panel 32. The outer weather strip 34 is arranged so that the outer weather strip 34 abuts an inner weather strip 14 provided around the opening 2 of the vehicle body when the opening and closing body 3 is closed.

The reinforcement member 35 is a metal, rectangular tube-shaped member for reinforcing the hollow opening and closing body 3 made up of the outer panel 31 and the inner panel 32. The reinforcement member 35 is provided to extend in the left-right direction in an upper portion of the opening and closing body 3.

The reinforcement member fixing clip 36 is a plastic fixation device for fixing the reinforcement member 35 to the inner panel 32.

The striker 37 is a metal hook member that is engageable with and detachable from the trunk lid lock mechanism 8. The striker 37 is attached to a lower end portion of the striker attachment reinforcing member 38 provided on a vehicle front-side lower end portion of the inner panel 32, and appears therefrom.

The striker attachment reinforcing member 38 is a metal plate member for reinforcing the vehicle front-side lower end portion of the inner panel 32 in order to attach the striker 37 to the opening and closing body 3.

Bumper Member

As illustrated in FIG. 1, the bumper member 4 is arranged under the above-described opening and closing body 3. The bumper member 4 is, for example, a plastic member extending in the vehicle width direction. A license plate mounting part 4*a* is formed at a central portion of a rear surface of the bumper member 4.

License Plate

The license plate 10 is screwed to the license plate mounting part 4*a* of the bumper member 4 located at a lower position relative to the opening and closing body 3.

Rear Bumper Beam

As illustrated in FIG. 3, the rear bumper beams 11 are each a metal structural member for holding the bumper member 4. The rear bumper beams 11 are arranged inside the bumper member 4, and extend in the vehicle width direction. The rear bumper beams 11 are located rearward relative to the image capturing device 6 in side view.

Rear Side Frame

The rear side frames 12 are rectangular tube-shaped, metal structural members respectively arranged in left and right end portions of the vehicle 1. The rear side frames 12 respectively extend forward from left and right end portions of the rear bumper beams 11 via bumper extensions 13.

How Vehicle Body Rear Structure Operates

Next, referring to FIGS. 1 to 5, descriptions will be provided for how the vehicle body rear structure according to the embodiment of the present invention operates.

As illustrated in FIG. 1, the rear surface part 3*b* of the opening and closing body 3, which is a trunk lid arranged in the vehicle body rear part 1*a*, has the projecting part 31*c* at a position located slightly higher than a central portion of the rear surface part 3*b*. The rear surface part 3*b* is provided with emblem 5 using the projecting part 31*c* as the pedestal of the emblem 5. The image capturing device installation hole 31*e* in which to arrange the lens part 62 of the image capturing device 6 is formed on the lower side of the projecting part 31*c*. As illustrated in FIGS. 3 and 4, the image capturing device 6 is installed in a space between the outer panel 31 and the inner panel 32, and does not projects out rearwardly from the opening and closing body 3.

With this structure, the image capturing device 6 is arranged at a position relatively high above the ground surface. Thus, the image capturing device 6 is installed at a position such that the image capturing device 6 can easily capture images behind the vehicle 1 and raindrops, muddy water and the like are less likely to be adhered to the image capturing device 6.

A vehicle body rear structure according to an embodiment of the present invention includes: an opening and closing body 3 for opening and closing an opening 2 defined in a vehicle body rear part 1*a*, the opening and closing body 3 having an outer panel 31 and an inner panel 32 located on an inner side of the vehicle relative to the outer panel 31, the opening and closing body 3 having a rear surface portion formed by the outer panel 31 and the inner panel 32 and facing substantially in a vehicle rearward direction, the outer panel 31 having a projecting part 31*c* projecting rearward from a rear surface of the outer panel 31 of the rear surface portion; a license plate 10 provided on a bumper member 4 located under the opening and closing body 3; an emblem 5 provided on the rear surface of the outer panel 31 of the rear surface portion using the projecting part 31*c* as a pedestal of the emblem 5, and an image capturing device 6 installed between the outer panel 31 and the inner panel 32 in the rear surface portion and configured to capture images behind the vehicle. The image capturing device 6 is installed in an image capturing device installation hole 31*e* formed on a portion of the rear surface portion that is lower than the projecting part 31*c*.

With this structure, even when the license plate 10 is provided on the bumper member 4, the projecting part 31*c* of the emblem 5 can prevent water drops and raindrops from being adhered to the image capturing device 6, as illustrated in FIGS. 3 and 4. This makes it possible to prevent the image capturing device 6 from capturing the water drops and the raindrops. Furthermore, the outer panel 31 and the inner panel 32 of the opening and closing body 3 cover the image capturing device 6, and thus can protect the image capturing device 6 by preventing an external force from being applied to the image capturing device 6. Moreover, as the image capturing device installation hole 31*e* is provided at a position lower than the emblem 5, the image capturing device installation hole 31*e* allows arranging the image capturing device 6 in such a way that the image capturing device 6 is less noticeable, and accordingly enhances the external appearance.

In addition, the projecting part 31*c* and the emblem 5 are configured such that the emblem 5 extends from the rear surface of the outer panel 31 toward the rear of the vehicle and inclines downwardly.

With this structure, as the emblem 5 inclines downward, the projecting part 31*c* located above the image capturing device 6 plays the role of eaves or a rain cover for the image capturing device 6, and is accordingly capable of preventing water drops flowing down the vehicle body from entering the image capturing device 6.

Furthermore, the projecting part 31c is formed integrally with the outer panel 31.

With this structure, as the image capturing device installation hole 31e and the projecting part 31c serving as the pedestal of the emblem 5 are integrally formed in the outer panel 31, the image capturing device installation hole 31e, in which the image capturing device 6 is arranged, and the projecting part 31c can be formed in an efficient manner. This formability of the outer panel 31 allows accurately arranging the image capturing device 6 and accurately setting the angle of view thereof, and reduces variations in the shapes of manufactured emblems 5.

Moreover, as illustrated in FIGS. 3 and 4, a fixation device 7 for fixing the emblem 5 to the opening and closing body 3 is provided at a position higher than the image capturing device 6.

With this structure, as the emblem 5 can be firmly fixed to the opening and closing body 3 by the fixation device 7, it is possible to reduce adverse effects on the image capturing device 6 which can otherwise be caused by displacement and the like of the emblem 5.

Moreover, as illustrated in FIG. 3, the vehicle body rear structure further includes rear bumper beams 11 extending in the vehicle width direction and located rearwardly with respect to the image capturing device 6.

As the rear bumper beams 11 are located rearwardly with respect to the image capturing device 6, the image capturing device 6 can be protected by being prevented from being damaged in the event of a rear surface collision.

Modifications

It should be noted that the present invention is not limited to the foregoing embodiment. It is a matter of course that: the present invention can be variously modified and changed within the scope of the technical ideas; and the present invention covers inventions obtained through these modifications and changes.

For example, although the foregoing descriptions have been provided for the case where the emblematic design element 5a and frame 5b of the emblem 5 are attached to the emblem decoration portion 31d of the projecting part 31c of the outer panel 31, they may be integrally formed with the emblem decoration portion 31d.

In addition, for example, the emblem 5 may be formed by directly engraving the emblematic design on the outer panel 31, or by directly applying the emblematic design onto the outer panel 31.

Furthermore, the emblem 5 may be obtained by sticking a label or the like on which the emblematic design is drawn to the emblem decoration portion 31d.

Moreover, the lower outer panel 31b may be a plastic-molded garnish. In this case, the fixation device 7 may be integrally formed on the lower outer panel 31b with a plastic. Besides, in this case, the emblem 5 may be formed integrally with the lower outer panel 31b and the projecting part 31c with the plastic.

In addition, in a case where the lower outer panel 31b is made of a metal, the fixation device 7 for fixing the emblem 5 to the opening and closing body 3 may be fixed by welding instead of with a clip.

What is claimed is:

1. A vehicle body rear structure of a vehicle, the vehicle body rear structure comprising:
   an opening and closing body for opening and closing an opening defined in a vehicle body rear part, the opening and closing body having an outer panel and an inner panel located on an inner side of the vehicle relative to the outer panel, the outer panel having a rear surface part facing substantially in a vehicle rearward direction;
   a license plate provided on a bumper member located at a position lower than the opening and closing body;
   an emblem part arranged on the rear surface part and comprising a projecting part and an emblem decoration portion on which an emblematic design element is disposed, the projecting part projecting rearward from the rear surface part; and
   an image capturing device installed between the rear surface part of the outer panel and the inner panel and configured to capture images behind the vehicle,
   wherein the image capturing device is installed in an image capturing device installation hole formed in the rear surface part, the image capturing device installation hole located at a position lower than the projecting part, and
   wherein the image capturing device installation hole, the projecting part, and the emblem decoration portion are formed integrally with the outer panel.

2. The vehicle body rear structure according to claim 1, wherein the emblem part extends from the rear surface portion part toward a rear of the vehicle, inclining downwardly.

3. The vehicle body rear structure according to claim 2, wherein a fixation device for fixing the emblem part to the opening and closing body is provided on a portion of the opening and closing body that is higher than the image capturing device.

4. The vehicle body rear structure according to claim 3, further comprising a rear bumper beam extending in a vehicle width direction and located rearwardly with respect to the image capturing device.

5. The vehicle body rear structure according to claim 2, further comprising a rear bumper beam extending in a vehicle width direction and located rearwardly with respect to the image capturing device.

6. The vehicle body rear structure according to claim 1, wherein a fixation device for fixing the emblem part to the opening and closing body is provided on a portion of the opening and closing body that is higher than the image capturing device.

7. The vehicle body rear structure according to claim 6, further comprising a rear bumper beam extending in a vehicle width direction and located rearwardly with respect to the image capturing device.

8. The vehicle body rear structure according to claim 1, further comprising a rear bumper beam extending in a vehicle width direction and located rearwardly with respect to the image capturing device.

* * * * *